(12) United States Patent
Nayak et al.

(10) Patent No.: US 8,929,036 B2
(45) Date of Patent: Jan. 6, 2015

(54) ARC FAULT CIRCUIT DETECTION METHODS, SYSTEMS, AND APPARATUS INCLUDING DELAY

(75) Inventors: Amit Nayak, Atlanta, GA (US); Hugh T. Kinsel, Sugar Hill, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 699 days.

(21) Appl. No.: 13/081,146

(22) Filed: Apr. 6, 2011

(65) Prior Publication Data
US 2011/0249370 A1 Oct. 13, 2011

Related U.S. Application Data

(60) Provisional application No. 61/321,932, filed on Apr. 8, 2010.

(51) Int. Cl.
| | | |
|---|---|---|
| *H02H 3/00* | (2006.01) | |
| *H02H 1/00* | (2006.01) | |
| *H02H 1/04* | (2006.01) | |
| *H02H 3/027* | (2006.01) | |

(52) U.S. Cl.
CPC ............ *H02H 1/0015* (2013.01); *H02H 1/04* (2013.01); *H02H 3/027* (2013.01)
USPC ............................................. 361/42; 361/94

(58) Field of Classification Search
USPC ............................ 361/42, 78, 83, 87, 93.1, 94
See application file for complete search history.

(56) References Cited

U.S. PATENT DOCUMENTS

| | | | | |
|---|---|---|---|---|
| 7,307,820 | B2 * | 12/2007 | Henson et al. | .................. 361/42 |
| 7,349,188 | B2 * | 3/2008 | Zuercher et al. | ................. 361/42 |
| 7,368,918 | B2 * | 5/2008 | Henson et al. | ................. 324/536 |
| 7,463,037 | B2 * | 12/2008 | Henson et al. | ................. 324/536 |
| 2007/0153436 | A1 * | 7/2007 | Pellon et al. | ..................... 361/42 |
| 2008/0106832 | A1 * | 5/2008 | Restrepo et al. | ................ 361/42 |
| 2009/0161270 | A1 | 6/2009 | Beatty, Jr. | |
| 2009/0262471 | A1 * | 10/2009 | Nicolay et al. | .................. 361/42 |

FOREIGN PATENT DOCUMENTS

| | | |
|---|---|---|
| CN | 101039025 A | 9/2007 |
| CN | 101238623 A | 8/2008 |
| CN | 101573847 A | 11/2009 |
| JP | 2007267592 A | 10/2007 |

OTHER PUBLICATIONS

PCT International Search Report mailed Oct. 5, 2011 corresponding to PCT International Application No. PCT/US2011/031563 filed Apr. 7, 2011.
Translation of Chinese Office Action mailed Aug. 18, 2014 corresponding to Chinese Application No. 201180028164.X filed Apr. 7, 2011 (24 pages).

* cited by examiner

*Primary Examiner* — Dharti Patel (57) ABSTRACT

In one aspect, a method of electrical arc fault detection when high frequency (e.g., RF noise) is present is disclosed. The method includes determining if first arcing criterion is met, determining if delay criterion is met, implementing a delay for a delay period if the delay criterion is met, and determining if second arcing criterion is met. If the second arcing criterion is met, then a trip signal may be sent to trip the circuit breaker. In another aspect, the method includes determining if first arcing criterion is met, starting delay period if the first arcing criterion is met, determining if delay criterion is met, and if the delay criterion is met, determining if second arcing criterion is met. An arc fault detection apparatus adapted to carry out the methods, and systems including the arc fault detection apparatus are disclosed, as are various other aspects.

20 Claims, 7 Drawing Sheets

ARC FAULT CIRCUIT DETECTION METHODS, SYSTEMS, AND APPARATUS INCLUDING DELAY

RELATED APPLICATIONS

This application claims priority to U.S. Provisional Application Ser. No. 61/321,932 entitled "METHOD AND APPARATUS FOR CURRENT BASED DYNAMIC TRIP TIME CALCULATION FOR COMBINATION AFCI" filed on Apr. 8, 2010, the disclosure of which is hereby incorporated by reference in its entirety herein.

FIELD OF THE INVENTION

The present disclosure relates generally to arc fault detection in electrical circuits and, more particularly, to methods, systems, and apparatus for detecting and mitigating arc faults in electrical systems.

BACKGROUND

Electrical systems, for a number of known reasons, may experience unwanted electrical arc faults. Combination Arc Fault Circuit Interrupters (AFCIs) are adapted to detect low current arc faults. However, such combination AFCIs may monitor current waveforms that may have a considerable amount of RF (Radio Frequency) noise present therein. The RF noise may be due to short duration arcing, such as when household switches are turned on and off. This RF noise may in some cases mimic an arc fault and result in unwanted tripping of the combination AFCI.

Therefore, a need exists for an AFCI and detection method that may discriminate between actual arc faults and conditions mimicking an arc fault, such as the presence of RF noise in the monitored current waveform.

SUMMARY

According to first aspect, a method of electrical arc fault detection is provided. The method includes determining if first arcing criterion is met, starting a delay period if the first arcing criterion is met, during the delay period, determining if delay criterion is met, and if the delay criterion is met, determining if second arcing criterion is met.

According to another aspect, a method of electrical arc fault detection is provided. The method includes determining if first arcing criterion is met, determining if delay criterion is met, implementing a delay for a delay period if the delay criterion is met, and determining if second arcing criterion is met.

In accordance with yet another aspect the present invention, an electrical fault detection apparatus is provided. The electrical fault detection apparatus includes an electrical circuit adapted to monitor a current waveform and high frequency noise; and a microprocessor coupled electrical circuit, the microprocessor adapted to determine if first arcing criterion is met, initiate a delay based upon whether delay criterion is met, and send a trip signal if second arcing criterion is met.

In accordance with another aspect the present invention, an electrically protected system is provided. The electrically protected system includes an electrical load, and an electrical fault interrupting apparatus coupled to the electrical load and having an electrical circuit adapted to monitor a current waveform and high frequency noise, and a microprocessor coupled to the electrical circuit, the microprocessor adapted to determine if first arc criterion is met, and initiate a delay based upon whether delay criterion is met, and after the delay, if second arcing criterion is met, send a trip signal to interrupt current to the load.

Still other aspects, features, and advantages of the present invention may be readily apparent from the following detailed description by illustrating a number of exemplary embodiments and implementations, including the best mode contemplated for carrying out the present invention. The present invention may also be capable of other and different embodiments, and its several details may be modified in various respects, all without departing from the spirit and scope of the present invention. Accordingly, the drawings and descriptions are to be regarded as illustrative in nature, and not as restrictive. The drawings are not necessarily drawn to scale. The invention is to cover all modifications, equivalents, and alternatives falling within the spirit and scope of the invention.

DETAILED DESCRIPTION

Reference will now be made in detail to the exemplary embodiments illustrating various aspects of the invention, examples of which are illustrated in the accompanying drawings. Wherever possible, the same reference numbers will be used throughout the drawings to refer to the same or like parts.

Figure 4:
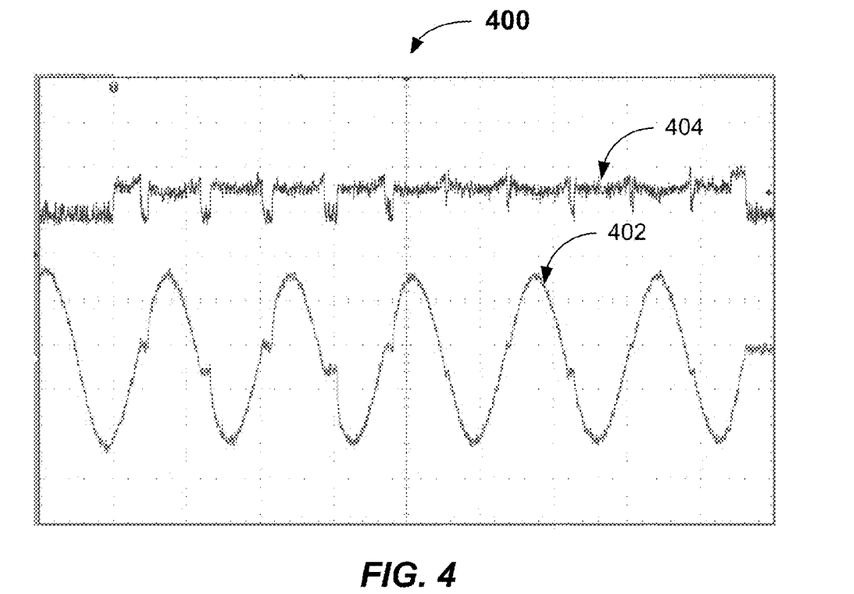
FIG. 4 illustrates a current waveform trace as well as a trace indicative of a received signal strength indicator (RSSI) of high frequency (e.g., RF noise).

The aforementioned problem of nuisance tripping associated with prior art arc fault detection methods and apparatus is overcome by the present invention. In common households, conventional snap switches (typically used for lighting) when used in normal operating scenarios may generate a significant amount of high frequency noise (e.g., RF noise). This high frequency noise may be generated due to arcing that occurs when the switches are opened or closed. As a result, as shown in FIG. 4, this high frequency noise (e.g., RF noise) may be characterized by an RSSI (Received Signal Strength Indicator) signal that may have a significant dynamic amplitude range and may be present for almost 80 milliseconds. Such signals, because they mimic an arcing event, will cause the microprocessor to generate a trip signal. If the high frequency noise is of a sufficient magnitude, and it is present for a sufficient period time to cause an incremented fault count value to exceed an arc fault threshold value, a trip signal will be sent and a trip mechanism will be activated. Accordingly, existing prior art combination AFCIs will detect the presence of this arc-like high frequency noise (e.g., RF noise) and activate the trip mechanism thereby resulting in an unwanted trip. Therefore, the prior art method detects the presence of mimicked arc faults in combination AFCI based upon high frequency noise (e.g., RF noise) regardless of the strength of the load current present.

The present invention avoids tripping on such arc-mimicking, high frequency noise (e.g., RF noise). The present invention avoids nuisance tripping by implementing a time delay. In one aspect, the time delay is determined based upon meeting certain delay criterion. Use of the term "criterion" herein may mean a singular condition or a set of conditions. For example, the delay criterion may be related to the relative strength of a current waveform (e.g., a load current waveform). In particular, in a first aspect, a method of detecting an arc fault is provided, wherein the presence of high frequency noise (e.g., RF noise) is detected (e.g., via monitoring an RSSI signal). The present invention detects the presence of high frequency noise (e.g., RF noise) by monitoring the amplitude characteristics of the RSSI signal and the amplitude of the current waveform, and then may implement a time delay in the trip calculation and the activation of a trip circuit for a certain period, such as an amount of time or number of half cycles, or until certain conditions or criterion is met. Therefore, high frequency noise (e.g., RF noise) caused by arcing during the switching operation of household switches can be tolerated by a combination AFCI incorporating the present invention. In some embodiments, if the delay criterion is not met, then the routine simply continues to monitor to determine that first arcing criterion is met. For example, if the amplitude characteristics of the bad current are below a certain threshold for a certain limited period of time or if the high frequency noise (e.g., RF noise) present does not persist beyond a certain period of time such that the delay criterion is not met, then no tripping may be activated. However, if the RF noise caused by an actual arc fault in the electrical wiring persists beyond a certain period of time such that delay criterion is met, and the first arcing criterion is still met, the present invention will determine if second arcing criterion is met, and, if yes, activate the tripping mechanism to disengage the power from bad.

As will be apparent, in some embodiments, the time delay may be proportional to the strength of the amplitude of a current waveform (e.g., the bad current waveform). Thus, introduction of this delay results in a dynamically changeable trip time based on the amplitude of the current. Also disclosed herein are several different methods to detect the strength of the current waveform. However, it should be apparent that the delay may be dynamically set based upon the magnitude of the current waveform according to any suitable method. Thus, the present invention may introduce a delay proportional to the current magnitude (e.g., magnitude of the bad current) to make sure the activation of the trip mechanism (e.g., actuator) only occurs if arc-like high frequency noise (e.g., RF noise) is present for a relatively longer period of time.

In another method aspect, it is first determined if a first arcing criterion is met, and if yes, then it is determined if delay criterion is met. If the delay criterion if not met, then no delay may be implemented. If the delay criterion is met, then a delay may be implemented. Whether or not a delay is implemented, the method determines if second arcing criterion is met, and then sends a trip signal to trip the circuit breaker if the second arcing criterion is met.

In another aspect, to avoid unwanted breaker tripping on current waveforms that mimic arc fault events (e.g., due to RF noise present), an improved electrical fault interruption apparatus is provided. The electrical fault interruption apparatus is used in an electrically protected system and is adapted to carry out the above-described method aspects and is described in more detain below herein.

These and other embodiments of methods, systems, and apparatus of the invention will be explained further with reference to FIGS. 1-8 herein. Methods for low current arc fault detection are described by the U.S. patent application Ser. No. 11/978,969, filed on Oct. 30, 2007, titled "Systems And Methods For Arc Fault Detection," the disclosure of which is hereby incorporated by reference in its entirety herein.

Figure 1:
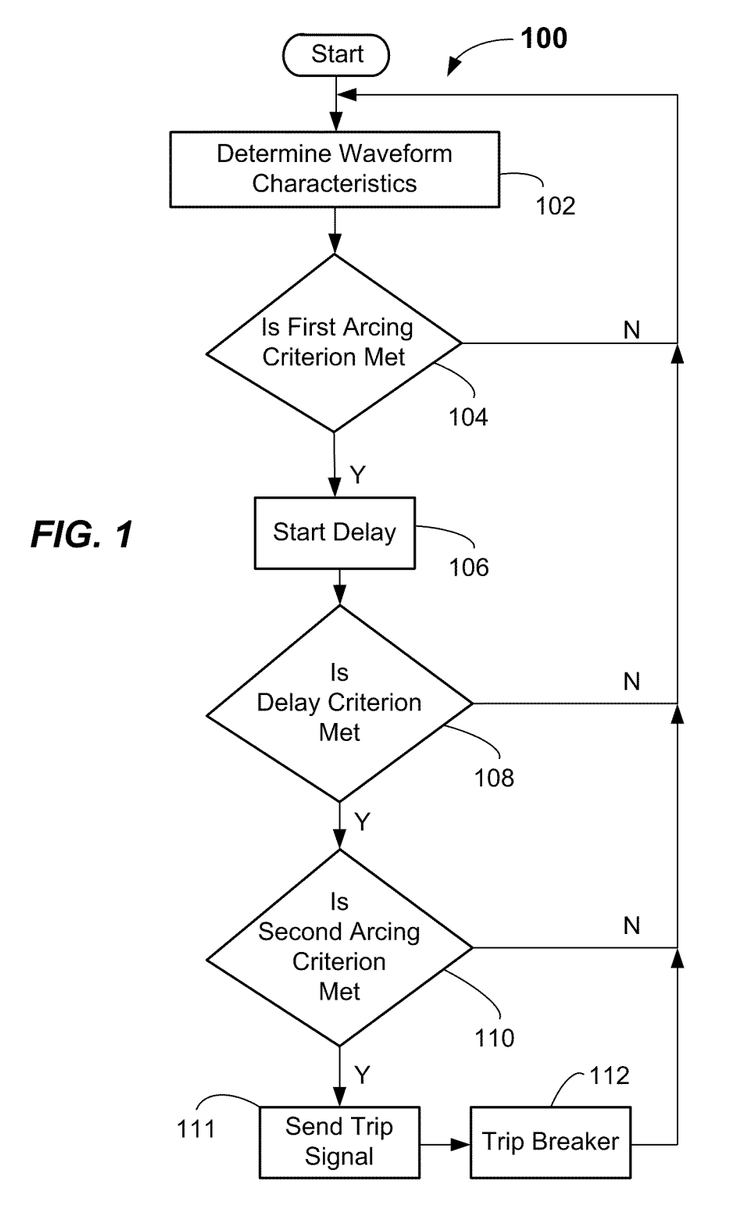
FIG. 1 illustrates a flowchart of an embodiment of a method according to a first aspect of the present invention.
Figure 7:
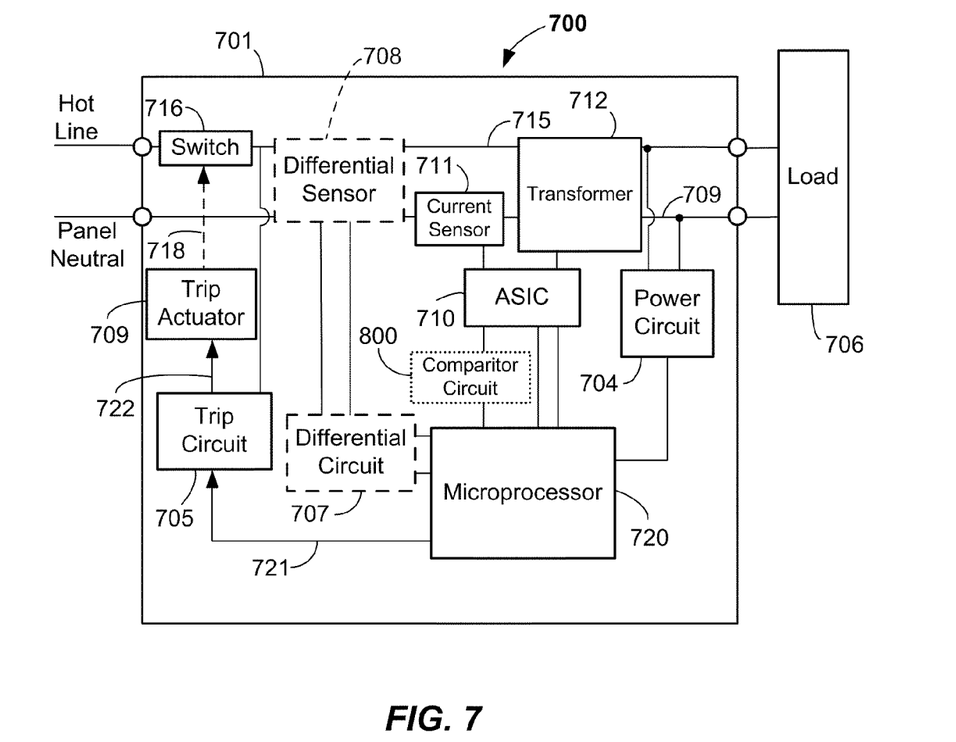
FIG. 7 illustrates an embodiment of exemplary arc fault interruption system and apparatus according to aspects of the present invention.

A first exemplary embodiment of a method of the invention will now be described with reference to FIG. 1 and FIG. 4. The method 100 includes determining waveform characteristics in block 102. Determining the waveform characteristics may include measuring the amplitude of the current waveform. For example, the determining the waveform characteristics may include determining the current amplitude passing through the neutral line 709 (FIG. 7). Optionally, the magnitude of the current in the hot line 715 may be used. In some embodiments, the determining of the waveform characteristics may include determining characteristics of a superimposed high frequency (e.g., RF noise) component. Inputs from a current sensor 711 and transformer 712 (FIG. 7) may be processed and a signal waveform indicative of the magnitude of the high frequency noise (e.g., RF noise) may be extracted therefrom. For example, the extracted signal may be an RSSI signal 404 such as shown in FIG. 4. The RSSI signal may be obtained from any suitable electrical circuit, such as shown in FIG. 7. For example, the RSSI signal may be provided from an application-specific integrated circuit (ASIC) 710. The ASIC 710 receives a first current waveform from a current sensor 711 and a second waveform (current or voltage) from an RF transformer 712. The ASIC 710 processes the waveforms to produce an AFout signal which may be a rectified and conditioned waveform, and an RSSI signal, as well as a zero crossing signal. These signals may then be used by the method to determine whether to send a trip signal or implement a delay according to the invention. However, it should be understood that the invention is not limited to processing an RSSI signal generated from a circuit monitoring high frequency noise (e.g., RF noise). Other conventional methods of determining whether to trip the circuit breaker may be used, such as examining the slope and/or magnitude of a current waveform. However, in the depicted embodiment, the high frequency noise signal is defined as including frequencies above 1 MHz, or even above 10 MHz in some embodiments. In some embodiments, the RSSI signal is conditioned to include frequencies between 18 MHz-25 MHz. The high frequency component may be extracted from the neutral line 709, the hot line 715 or both using a suitable transformer and possibly other electrical coupling components. Likewise, the current waveform may be extracted from a current sensor 711, such as a tap in the neutral line 709 or load line 715. However, a current sensor 711 in the neutral line is depicted in FIG. 7.

Again referring to FIG. 1, in decision block 104, if a first arcing criterion is met, then rather than immediately trip, as in the prior art, a time delay is implemented in block 106. The first arcing criterion in block 104 may be any suitable arcing criterion used in conventional circuit breaker systems. In some embodiments, whether the first arcing criterion is met may be determined by examining an amplitude of the high frequency noise component, such as an RSSI signal 404 extracted by the ASIC 710 and provided to a microprocessor 720 (FIG. 7). For example, the first arcing criterion may examine the RSSI signal 404 for a first predetermined number of samples. An arc counter may be incremented for every sample wherein specific arcing criterion is met. For example, the arcing criterion may be determined to be met for the sample if the RSSI signal amplitude for the sample is above a preset RSSI threshold. In one implementation, the first arcing criterion may be met if the specific criterion is met for a first predetermined number of half cycles of the load current, such as 4-5 cycles, for example. Other numbers of cycles may be used. Other first arcing criterion may be used as well. For example, the first arcing criterion may determine if both the slope of the current waveform at the zero crossing of the half cycle and the current waveform amplitude for the half cycle is above preset thresholds.

If the first arcing criterion is not met (N), then the arc fault detection method 100 may continue to monitor the waveform characteristics. Depending upon whether specific arcing criterion is met (e.g., RSSI above a threshold) for a predetermined amount of time, an arc fault counter may be decremented or may be reset to zero. For example, if no load current in the current waveform 402 is sensed by the zero crossing signal for a predetermined amount of time (e.g., about 100 milliseconds), then the arc counter may be reset or decremented.

However, if the first arcing criterion in 104 is met (Y), for example, as determined by an arc fault count of an arc fault counter once exceeding a preset arc count value a first time, then the delay period is started in block 106. During the delay period in block 106, the arc fault detection method tests the characteristics of the current waveform to determine if delay criterion is met in block 108. The delay criterion may be any suitable delay criterion that is related to a strength or magnitude of the current in the current waveform 402, for example. The delay period may be any predetermined amount of time greater than zero second. For example, the delay period may be a fixed time of greater than zero to about 1.0 seconds, or even between 0.5 seconds and about 1.0 seconds, or even about 1.0 second in some embodiments. Optionally, the delay may be a predetermined number of half cycles. Other delay periods may be used.

Figure 5:
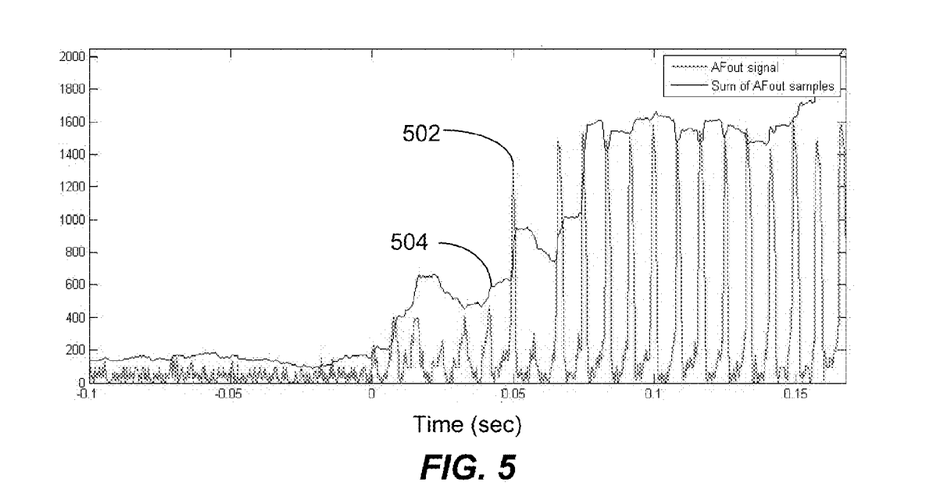
FIG. 5 illustrates various plots of a rectified current waveform (AFout) and a sum of the output waveform.

As discussed above, the delay criterion may be any delay criterion that examines a magnitude of the current waveform, such as the load current over a predetermined number of half cycles. For example, in one embodiment, as best shown in FIG. 5, a rectified and conditioned load current signal (AFout) from the ASIC 710 may be provided to the microprocessor 720. The signal AFout may be a rectified half wave signal representative of the AC current in the neutral line 709 and may be provided to an Analog to Digital converter (ADC) block of a microprocessor 720 from the ASIC 710. The ADC block may result in a 10 bit result, for example. The microprocessor 720 may then calculate a maximum amplitude value of the signal AFout provided to the ADC block by any suitable method. For example, an averaging method, or a sample hold and compare method may be used. Other peak amplitude detection methods may be used.

The samples of the AFout signal may be sampled at any suitable sampling rate, such as one sample every 160 microseconds. Other suitable sampling rates may be used. The sampled maximum amplitude values may be stored in memory. The memory may include a buffer that may be categorized as a First In First Out (FIFO) buffer containing a predetermined number of samples. For example, the predetermined number of samples in the buffer may be between about 50 samples and about 200 samples, depending on the sampling rate chosen. In some embodiments, the number of samples in the buffer may be about of 100 samples. Other numbers of samples in the buffer may be used. The samples may be summed in the buffer to provide a sum of the AFout amplitude signals over the total sample period of the buffer. For example, the buffer may sum a predetermined number of AFout samples. In other embodiments, the buffer may be a sum the squares of a predetermined number of AFout samples. Other sums of some aspect of the AFout signal may be used.

In this embodiment of the invention, according to the FIFO method, a new sample is stored at the front of the buffer and the oldest sample is removed from the buffer. The sum of these stored samples (e.g., 100 buffer elements) thus may be updated every sample period (e.g., about every 160 microseconds). The sum of the total stored samples (e.g. sum of the 100 stored samples) therefore provides a method to average the signal as well as track the general trend of the magnitude peak of the AFout signal.

FIG. 5 illustrates an example of a trace of the AFout signal 502 and a corresponding trace illustrating a sum of 100 AFout samples 504 over a sampled period of time. As shown, the sum of AFout samples captures and tracks the peak of the AFout signal. A typical load current rating of many household switches is about 15 Amps peak. Ninety percent of the rated current is about 13.5 Amps. An analysis of a typical load current of 13.5 Amps processed by the ASIC and the resultant full wave rectified signal sampled by the microprocessor 720 resulted in a sum of the AFout samples. The mean value of this sum over 100 samples was found to be close to a constant of about 2375. Accordingly, this number was picked as a representative of load current delay threshold constant. However, other values for the load current delay threshold constant may be chosen and used.

Again referring to FIG. 1, once the arc fault count value reaches the fault count threshold once (i.e., the first arcing criterion is met in 104), an internal trip counter may be set to 1 (delay mode), and an internal delay count timer in the microprocessor 720 may be activated in block 106. The delay count timer may be incremented by a predetermined amount for every sampling period. For example, the delay count timer may be incremented by 1 integer every sample period (e.g., every 160 microseconds). Other integer increments may be used, such as 2, 3, 4, etc. The delay count timer may be reset or cleared if there was no load current activity demonstrated by, for example, examining a zero crossing mask signal for more than pre-defined time (for example, about 104 milliseconds). The delay count timer may also be reset or cleared if there is no longer any arcing activity detected (e.g., no or low RSSI signal activity (below a threshold)) from the ASIC 710 for a predetermined number of samples, thereby indicating no arcing. The delay count timer may also be reset or cleared once a predetermined fixed delay time has elapsed (e.g., 1 second of delay time has elapsed). Each of these are examples of where the delay criterion is not met (N) in block 108, and wherein the method simply continues to monitor the waveform for first arcing criterion activity in block 104.

An example of when the delay criterion is met (Y) is shown in FIG. 6. During the delay, the arc fault count value continues to be incremented or decremented based on the strength of the RSSI signal from the ASIC 710. The arc fault count value may reach the trip threshold multiple times once the delay count timer is activated during the delay period (during the delay mode) in block 106. However, the trip counter continues to be set at 1 (delay mode), and no change in alert status takes place until the delay criterion is met (Y) in block 108. As shown in FIG. 6, the delay counter is shown being incremented by trace 602. The delay count timer is shown being incremented by a fixed number of units for each successive sample taken. A difference signal 604 may also be provided. The difference signal 604 may be a predetermined constant minus the sum of any parameter related to the AFout signal from the ASIC 710. In some embodiments, the parameter related to the AFout signal is a sum of the AFout samples over a predetermined time or number of samples. For example, the sum of the AFout signal over a 100 sample buffer is represented by trace 504. As shown in FIG. 6, as an increasing AFout amplitude is detected from the ASIC 710, the AFout sum in the buffer increases in value over time. Effectively, this happens because a relatively low value is removed and a relatively higher value is added to the buffer based upon FIFO rules.

In this example, the difference signal 604 is composed of a constant (e.g., 2375) minus the sum of the AFout samples in the multi-sample containing buffer. Once the delay period is started in block 106, the delay count timer is incremented for each sample period, and so is the difference signal. For each increment, the delay count value is compared to the difference signal (e.g., 2375 minus the sum of the AFout samples). When the delay timer count is greater than or equal to the difference signal (e.g., 2375 minus the sum of the AFout samples), a trip active mode (e.g. alert mode 2) is activated. The trip active mode is an alert mode that is implemented when the delay criterion is met (Y) in block 108.

Once the trip active mode is activated, the method continues to monitor the current waveform 402. If second arcing criterion is met in block 110, such as for a second predetermined number of samples or half cycles (Y), then the arc fault detection apparatus (e.g., circuit breaker) 700 is tripped in block 112 by sending a trip signal from the microprocessor 720 in block 111 to a trip circuit 705. The trip signal activates a trip actuator 709 to open a switch 716 and thereby remove power from the load 706 (see FIG. 7). Thus, according to a first aspect of the invention, a delay is implemented after an arc count threshold value is reached. Instead of sending a trip signal, the microprocessor 720 continues to process the waveform signal and increment/decrement the arc fault count value. For example, the monitoring may be based on communication with an ASIC 710. In the described embodiment, the trip active mode is only activated if the delay criterion is met (Y) before the delay timer has completely timed out by reaching the fixed delay time. If the delay criterion is met (Y) before the delay timer reaches its predetermined limit, then the present invention effectively operates to implement a delay that is proportional to the amplitude characteristics of the load current of the current waveform 402. After the delay criterion is met (Y) in block 108, the method continues to monitor the characteristics of the waveform for second arcing criterion. The second arcing criterion may be the same as the first arcing criterion. For example, an RSSI signal 404 from the ASIC 710 may be detected and measured against an RSSI threshold. If the second arcing criterion is met (Y) in block 110 for a predetermined time, samples, or number of half cycles, then a trip signal is sent in block 111. For example, the second arcing criterion may be an RSSI threshold being met for a certain number of samples. Other suitable second arcing criterion may be used.

Thus, it should now be apparent that if, after the delay criterion is met (Y) in block 108, the arc-like noise does not subside after a certain additional period (e.g., period of time, samples or number of half cycles), the arc fault detection apparatus 700 will remove power from the load 706.

Figure 6A:
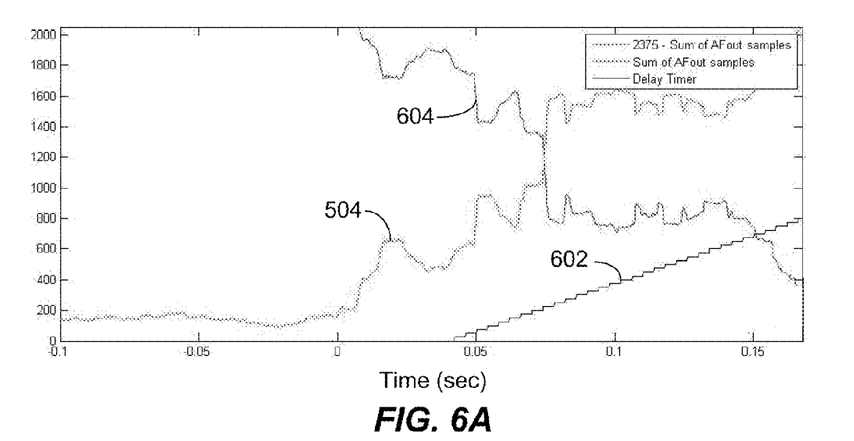
FIG. 6A illustrates various plots of a delay count timer, a sum of the rectified load current waveform (AFout), and a difference signal.
Figure 6B:
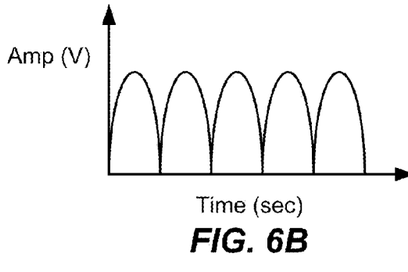
FIG. 6B illustrates the rectified current waveform (AFout).

As shown in FIG. 7, the analog ASIC 710 may include an AC current conditioning system that conditions the current waveform detected by the current sensor 711. The AC current conditioning logic unit may generate a signal representative of the load current flowing through the branch being monitored by the combination AFCI. The AC current conditioning system may also provide a full-wave rectification which processes the AC current for half wave signal analysis such as to determine a half cycle amplitude and zero crossings. The conditioned output signal from the ASIC 710 is referred to herein is the "AFout" signal and is simply a rectified and filtered sinusoid as shown in FIG. 6B.

In accordance with an alternative embodiment, the change of the sum of AFout samples can also be taken into consideration, so that if the magnitudes of the half cycles of load current are increasing rapidly, the delay timer or the difference signal may be modified accordingly. For example, every predetermined number of samples (e.g., every 100th iteration), the sum of AFout samples may be captured and stored in memory as a variable (NewSum). This sum (NewSum) may be compared to the previous value (PrevSum) calculated from a previous predetermined number of samples (e.g., previous 100 samples). If the sum of AFout sample sum (New Sum) calculated in this instance is greater than the previous sum (PrevSum), then a ratio of the difference (NewSum/PrevSum) may be used to dynamically modify the increment of the delay timer. For example, if the time was normally being incremented by one integer per sample cycle, the NewSum is 1000, and the PrevSum was 500, then the delay timer may be incremented by a factor of 1000/500=2, i.e., an integer of 2. In this manner, the delay timer may be sped up so that the delay will be shortened and the trip active mode will be reached relatively faster. Optionally, the factor may be applied to the difference signal with the same result of the trip active mode being reached relatively faster. Alternate methods of providing an increment based upon a rate of change of the load current may be used. Thus, effectively the delay period is increased if a decrease in amplitude of a current waveform is detected, and decreased if an increase in amplitude of a current waveform is detected.

Figure 2:
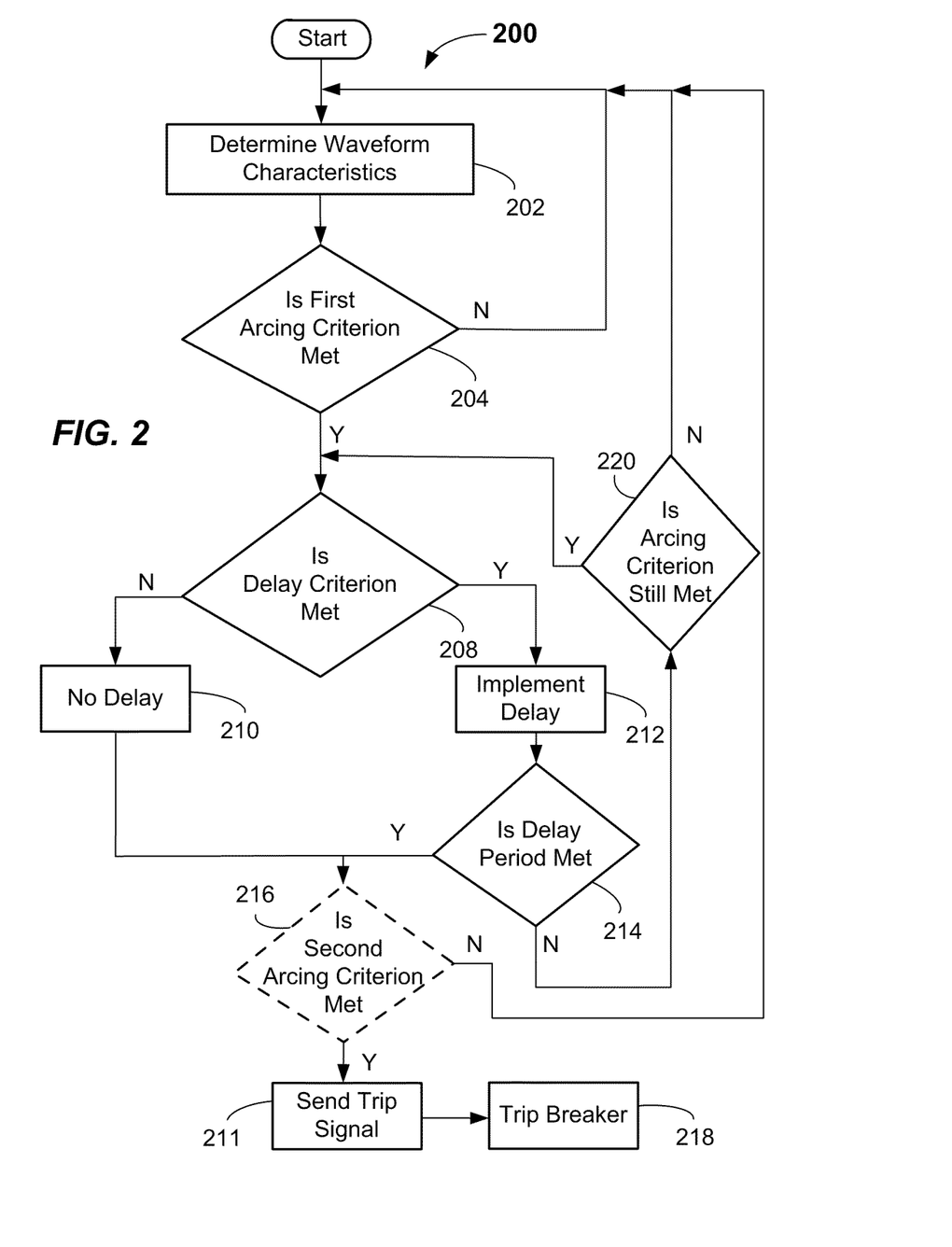
FIG. 2 illustrates a flowchart of an exemplary alternative embodiment of a method according to another aspect of the present invention.

Another embodiment of arc fault detection method 200 is shown in FIG. 2. In this embodiment, as in the previous embodiment, the waveform characteristics are determined and measured in 202. The current waveform may be conditioned to provide a high-frequency noise signal (e.g., an RSSI signal 404) as previously described. As in the previous embodiment, it is first determined if the first arcing criterion is met in block 204. For example, the first arcing criterion may be met if the RSSI threshold is exceeded for a first predetermined period (period of time, number of samples, or half cycles or the current waveform). Next, it is determined if delay criterion is met in block 208. The delay criterion may be whether a current magnitude threshold of the AFout signal (e.g., from the ASIC 710) is met by the current magnitude of the half cycle. Any suitable method for determining if the magnitude threshold is exceeded may be used.

Figure 8:
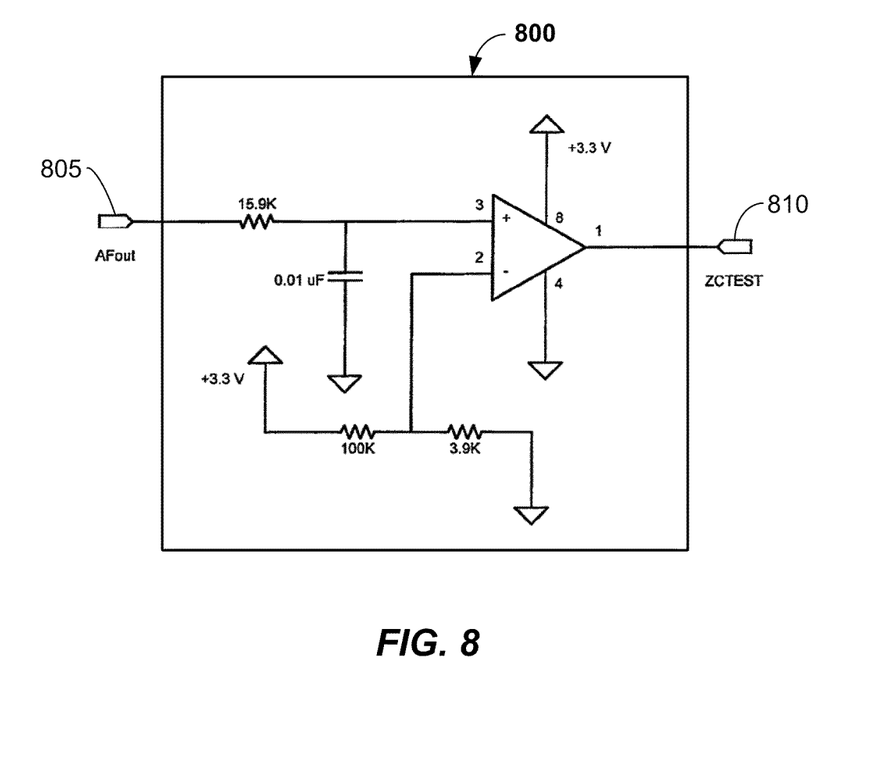
FIG. 8 illustrates an embodiment of exemplary comparator circuit according to an aspect of the present invention.

One way to determine if a current threshold is exceeded may be accomplished by the use of a comparator circuit 800 as described in FIG. 8. This comparator circuit 800 may be placed between the ASIC 710 and the microprocessor 720 in FIG. 7. FIG. 8 illustrates that the AFout signal of the ASIC 710 is connected to a comparator circuit 800 at tap 805 and the output tap 810 (shown as ZCtest) of the comparator circuit 800 is fed to an input of the microprocessor 720. The relative level of comparison can be modified to any threshold value.

Figure 6C:
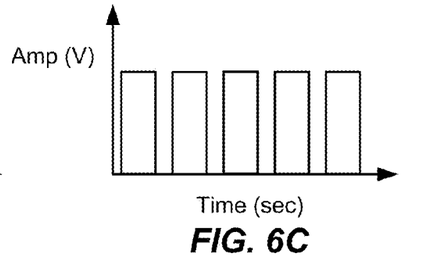
FIG. 6C illustrates a plot of a Pulse Width Modulated (PWM) signal based upon a relatively high magnitude of the rectified current waveform (AFout).
Figure 6D:
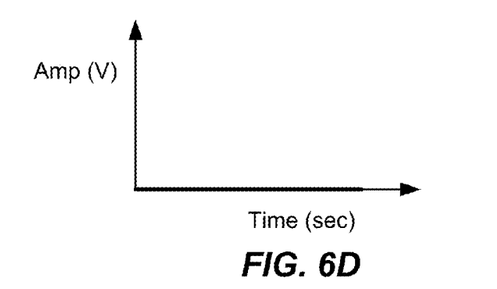
FIG. 6D illustrates a plot of a signal based upon a relatively low magnitude of the rectified current waveform (AFout).

For purpose of illustration, the threshold value of the comparison level may be set at 10 Amps. For load current with an amplitude of greater than 10 Amps, the output of the comparator circuit 800 is a pulse width modulated (PWM) signal at tap 810 as shown in FIG. 6C. This pulse width modulated (PWM) signal is fed into the microprocessor 720, which is operational to monitor the PWM. If a low, non pulse width modulated signal (as shown in FIG. 6D) is present and detected in the output of the comparator circuit 800, the AFout is interpreted as being lower than 10 Amps. Alternatively, a PWM (a toggling signal, as shown FIG. 6C) where a magnitude changes (e.g., a detected square wave) at 60 Hz is interpreted as greater than 10 Amps. In other words, if the AFout signal is above the magnitude threshold, a toggling signal is provided (as in FIG. 6C), and if below, no signal is provided from the comparator circuit 800 (as shown in FIG. 6D).

Again referring to FIG. 2, if the PWM signal is present, the delay criterion is not met (N) in block 208, i.e., a relatively high current in AFout above the threshold is detected, and no delay is provided in block 210. However, if a low is detected at the tap 810, i.e., no PWM signal is detected as in FIG. 6D, the delay criterion is met (Y) in block 208 and a delay is implemented in block 212. The delay period of the delay in block 212 may be a fixed amount of time or number of half cycles. For example, the delay time may be about greater than zero and less about 1.0 sec. Other delay times may be used. Once the delay period is met (Y) in block 214, the arc fault detection method 200 determines if second arcing criterion is met in block 216. If the second arcing criterion is met (Y) in block 216, then a trip signal is sent to the trip circuit in block 211 and the arc fault detection apparatus 700 (e.g., circuit breaker) is tripped in block 218. Upon tripping, the arc fault detection method 200 may stop until the arc fault detection apparatus 700 is reset, at which time, the arc fault detection method 200 may start again. If the second arcing criterion is not met (N) in block 216, the arc fault detection method 200 continues to monitor the characteristics of the waveform for arcing criterion and all counters may be reset.

If the delay period is not met (N) in 214, the arc fault detection method 200 may continue to test if the delay criterion is met if arcing criterion is still met in block 220. The arcing criterion may be that the magnitude of the RSSI signal is still above a threshold magnitude. Other arcing criterion may be used. If the arcing criterion is still met (Y) in block 220, and the delay criterion is still met (Y) in block 208, then the arc fault detection method 200 continues to cycle until the delay period is met. If at any time during the cycling, the delay criterion is not met (N) in block 208, such as by a high current being detected in the AFout signal, then no further delay is implemented, and if the second arcing criterion is met (Y) in block 216, the arc fault detection apparatus 700 is tripped in block 218.

Figure 3:
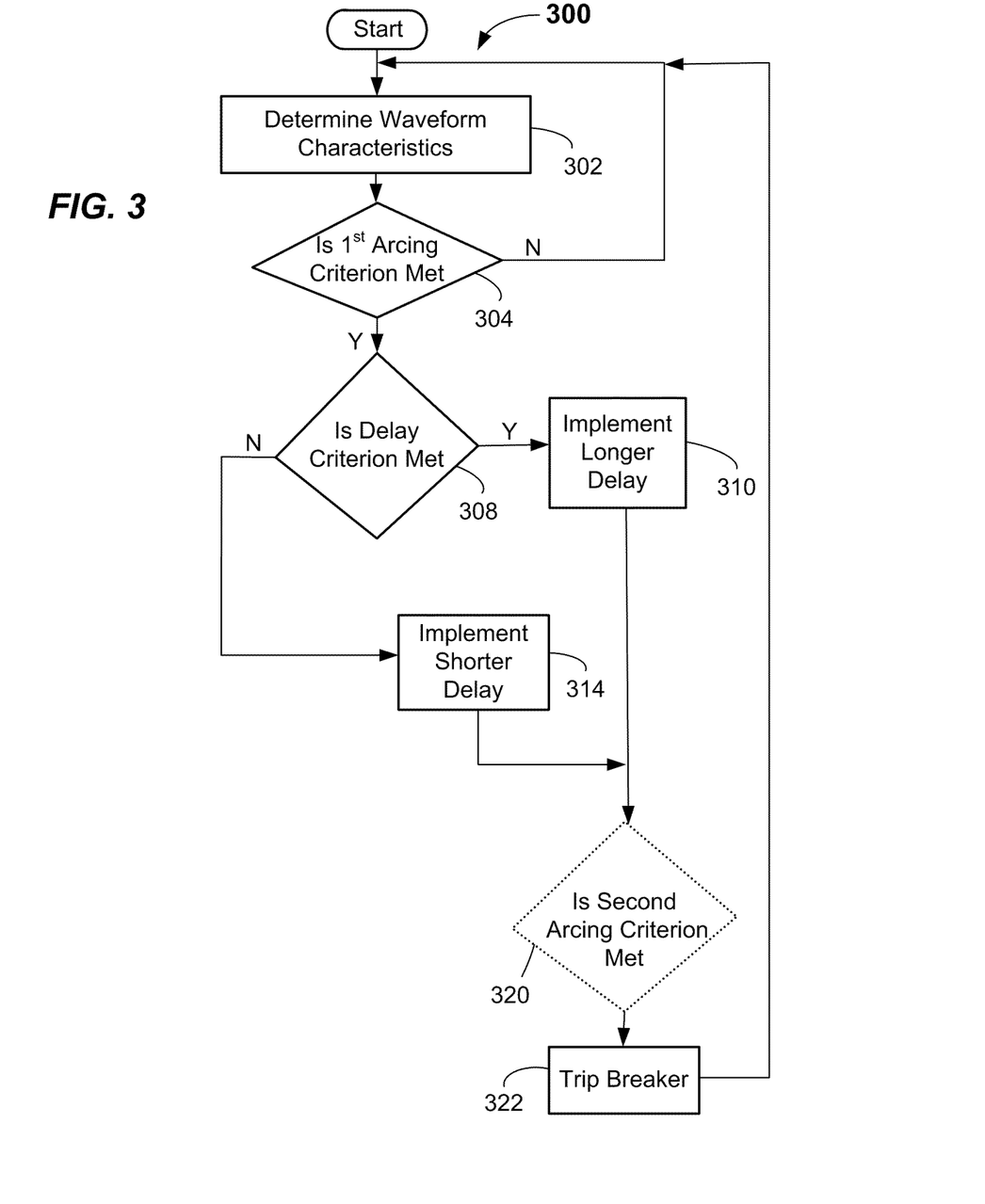
FIG. 3 illustrates a flowchart of another exemplary alternative embodiment of a method according to yet another aspect of the present invention.

FIG. 3. illustrates another alternative implementation of an arc fault detection method 300 where multiple delays may be implemented. As before, the presence of a PWM output from the tap 810 of a comparator circuit 800 may be detected. The present embodiment implements a two-level delay. The waveform characteristics are measured and determined in block 302 and it is determined that the first arcing criterion is met (Y) in block 304. If the PWM is toggling, i.e., the first delay criterion is not met (N) in block 308 because the AFout signal is relatively large, a shorter delay is implemented in 314. For example, when an arc fault count value has reached the arc count threshold to indicate a trip 2 times, the microprocessor 720 may send a trip signal that triggers the circuit breaker. If the PWM is not toggling, i.e., the first delay criterion is met (Y) in block 308, the microprocessor may send a trip signal that triggers the arc fault detection apparatus 700 in block 322 when the fault count value has reached the arc fault threshold for trip 4 times. In an alternative, the trip count for the "slower" trip can be modified dynamically if needed. In other words, a factor may be applied if the magnitude of the AFout signal is relatively larger, thus allowing for relatively faster tripping. As in the previous embodiments, the sending of the trip signal may be optionally contingent upon second arcing criterion being met in block 320. Any suitable second arcing criterion may be used, such as exceeding an RSSI threshold magnitude for a period of time, number of samples or number of half cycles of the current waveform, for example. Other second arcing criterion may be used. In a similar manner as described herein, more than two delay levels may be implemented (such as 3, 4, 5, etc.), where the level (length) of delay is proportional to, or related to, the magnitude of the AFout signal.

As illustrated in FIG. 7, the electrical fault detection apparatus 700 may include a housing 701 including fault detection circuitry, a trip circuit 705 adapted to receive a trip signal from a microprocessor 720 in line 721 and send an actuation signal in line 722 to a trip actuator 709 to open a switch 716 of the electrical fault detection apparatus 700. The dotted line 718 coupled between the trip actuator 709 and the switch 716 is indicative of a mechanical linkage or assembly that, upon actuation of a trip actuator 709, will cause the mechanical opening of the switch 716 thereby interrupting electrical power to the load 706. A power circuit 704 may be provided and is adapted to provide power to the various system components (e.g., microprocessor 720, trip circuit 705, trip actuator 709, sensors, etc.). The electrical fault interrupting apparatus 700 may also include a test circuit (not shown) including a button or switch for manually initiating a self-test process, and may include an audible or visual indicator such as a display (not shown) for outputting status, health, and/or fault information associated with the electrical fault detection apparatus 700. It is contemplated that the electrical fault detection apparatus 700 may include additional, different, and/or fewer elements than those listed above.

As illustrated in FIG. 7, the electrical fault detection apparatus 700 may be electrically coupled at its terminals to the panel neutral and the hot line and to one or more electrical load circuits including one or more electrical loads 706. The electrical fault detection apparatus 700 of the invention is configured and adapted to monitor electrical signals associated with the one or more electrical load circuits. In particular, the monitoring may be accomplished in the depicted embodiment by at least a current sensor 711 in the neutral line 709. The current sensor 711 may extract a signal indicative of the magnitude and frequency of the electrical current in the neutral line 709. Additionally, a transformer 712 may be provided to monitor high frequency noise (e.g., RF noise) in the hot line 715, the neutral line 709 or both the hot line 715 and the neutral line 709. The transformer 712 may be Part # WBC16-1TLB available from COILCRAFT of Cary, Ill., or a Part # ETC16-1TR-2TR available from MA/COM Technology Solutions of Lowell, Mass. Other transformers may be used. Likewise, a current sensor may be implemented on the hot line 715. An ASIC 710 may be provided to process the signals from the current sensor 711 and the transformer 712. The ASIC 710 may function to provide the AFout signal, a zero crossing signal, and a high frequency signal (e.g., RSSI signal) to the microprocessor 720. In the arc fault detection system 700, AC current conditioning, amplification, filtering, and full-wave rectification of the current waveform signal from the current sensor 711 may be provided by the ASIC 710.

The AFout signal from the ASIC 710 may be provided to the microprocessor 720 for analysis by the microprocessor 720. The ASIC 710 may also generate the RSSI signal by mixing, filtering, and amplifying the high frequency noise (e.g., RF noise) coupled from the transformer 712. The zero crossing may be generated from the AFout signal using a comparator in the ASIC 710. These signals are processed as discussed above to determine if a trip signal should be sent in line 721 to trip circuit 705.

The electrical fault interrupting apparatus 700 may optionally include a differential circuit 707 electrically coupled to a differential sensor 708. The differential sensor 708 may be a differential transformer. Such differential transformers are well known and will not be further explained herein. In the depicted embodiment, both the neutral line 709 and the hot line 715 may pass through the differential sensor 708. The signal from the differential sensor 708 is provided to a differential circuit 707. The differential circuit 107 functions to provide the microprocessor 720 with two PWM signals. Both the PWM signals correspond to the input signal greater than fixed thresholds determined for 50 mA and 250 mA current, respectively, for example. Other threshold values may be used. Once the PWM signal is received by the microprocessor 720, the pulse width of the signal is calculated and stored. For example, if the pulse width of the PWM signal is between limits (e.g., greater than 3 ms and less than 9 ms) for the 50 mA comparator, a differential fault counter may be incremented. If the differential fault counter is greater than a predetermined threshold, the microprocessor 720 sends a trip signal to the trip circuit 705. The differential circuit 707 having one or more amplifiers that may be electrically connected to the differential sensor 708 (e.g., transformer). Additional analog or digital filtering and/or conditioning components may be included in the differential circuit 707. The amplifiers may generate output digital signals at output nodes to the microprocessor 720. The outputs at output nodes are indicative of two different differential fault currents and are used to determine the differential fault current levels corresponding to 50 mA and 250 mA faults respectively, for example.

The arc fault detection apparatus 700 may include one or more electrical components or analog or digital circuits electrically coupled to a microprocessor 720. The microprocessor 720 may be an ATtiny461 processor available from ATMEL, for example. Microprocessor 720 may include one or more memory devices for storing information associated with arc fault detection apparatus 700. Memory devices may include any type of memory device suitable for the storage of data associated with operations of arc fault detection apparatus 700. Other types of microprocessors 720 may be used. Any suitable processor capable of processing incoming current waveform and high frequency (e.g., RF noise) signal, processing them and rendering a trip signal to the trip circuit 705 may be used. It is contemplated that additional, fewer, and/or different components may be associated with the arc fault detection apparatus 700. As should be apparent, in an alternative embodiment, an amplified and conditioned signal may be provided from the sensors 711 and transformer 712 to the microprocessor 720 and all rectification and calculations may be accomplished by the microprocessor 720, rather than in an ASIC 710.

Internal calculations and comparisons according to aspects of the invention described herein may increment an arc counter when in the trip active mode. When an arc count threshold is exceeded, a trip signal is sent in line 721 to the trip circuit 705. In other embodiments, an arc fault counter may be accomplished by providing a suitable charge to an analog circuit containing a capacitor. Upon reaching a predetermined charge magnitude (analogous to the counter threshold), a trip signal may be provided to a trip actuator 709 to open the switch 716. Following the sending of the trip signal, all arc fault counters and delay counters may be zeroed out.

It should be readily appreciated by those persons skilled in the art that the present invention is susceptible of broad utility and application. Many embodiments and adaptations of the present invention other than those herein described, as well as many variations, modifications, and equivalent arrangements, will be apparent from, or reasonably suggested by, the present invention and the foregoing description thereof, without departing from the substance or scope of the present invention. Accordingly, while the present invention has been described herein in detail in relation to specific embodiments, it is to be understood that this disclosure is only illustrative and exemplary of the present invention and is made merely for purposes of providing a full and enabling disclosure of the invention. This disclosure is not intended to limit the invention to the particular apparatus or methods disclosed, but, to the contrary, the intention is to cover all modifications, equivalents, and alternatives falling within the spirit and scope of the invention.

What is claimed is:

1. A method of electrical arc fault detection, comprising:
   determining if first arcing criterion is met;
   starting a delay period if the first arcing criterion is met, wherein the delay period is proportional to an amplitude of a current waveform;
   during the delay period, determining if delay criterion regarding the current waveform is met; and
   if the delay criterion is met, determining if second arcing criterion is met.

2. The method of claim 1, further comprising:
   if the second arcing criterion is met, sending a trip signal.

3. The method of claim 1, further comprising:
   if the delay criterion is not met, zeroing a delay counter after a fixed amount of delay time; and
   continuing to determine if the first arcing criterion is met.

4. The method of claim 1, further comprising sending a trip signal and tripping a breaker after the second arcing criterion is met.

5. The method of claim 1, wherein determining the first arcing criterion comprises incrementing an arc counter when specific arcing criterion is met, and comparing an arc count of the arc counter to an arc count threshold.

6. The method of claim 1, wherein determining the first arcing criterion comprises determining if an amplitude of a received signal strength indicator signal is above a threshold for a first predetermined period.

7. The method of claim 1, wherein the determining if a second arcing criterion is met comprises incrementing an arc counter, and comparing an arc count of the arc counter to an arc count threshold.

8. The method of claim 1, wherein the delay criterion comprises a delay counter being greater than a difference signal within a predefined time period.

9. The method of claim 8, wherein the delay counter is incremented at least one integer for each sample period.

10. The method of claim 8, wherein the difference signal comprises a constant less a sum of a number of AFout signals, wherein the AFout signals are conditioned current waveform data samples.

11. A method of electrical arc fault detection, comprising:
determining if first arcing criterion is met;
determining if delay criterion regarding a load current is met if the first arcing criterion is met;
implementing a delay for a delay period if the delay criterion is met; and
determining if second arcing criterion is met.

12. The method of claim 11, comprising sending a trip signal to trip a switch of an arc fault detection apparatus after the delay period, provided that the second arcing criterion is met.

13. The method of claim 11, wherein determining if the first arcing criterion is met comprises incrementing an arc fault counter, and comparing an arc fault count of the arc fault counter to an arc fault count threshold.

14. The method of claim 11, wherein the determining if the delay criterion is met comprises determining whether an amplitude of a current waveform is below a current amplitude threshold for a predetermined number of half cycles.

15. The method of claim 14, wherein if the amplitude of the current waveform is below the amplitude threshold for the predetermined number of half cycles, further comprising:
delaying for a fixed amount of time, or
delaying for a fixed number half cycles.

16. The method of claim 11, wherein the delay period is increased if a decrease in amplitude of a current waveform is detected, and decreased if an increase in amplitude of a current waveform is detected.

17. The method of claim 11, wherein if the delay criterion is not met, no delay is implemented, and a trip signal is sent to a switch of an arc fault detection apparatus after a second arcing criterion is met.

18. The method of claim 11, wherein
if the delay criterion is not met, a shorter delay is implemented, and
if the delay criterion is met, a longer delay is implemented.

19. An electrical fault detection apparatus, comprising:
an electrical circuit adapted to monitor a current waveform and high frequency noise; and
a microprocessor coupled to the electrical circuit, the microprocessor adapted to determine if first arcing criterion is met, determine if delay criterion is met in response to determining that the first arcing criterion is met, initiate a delay based upon whether the delay criterion is met, determine if second arcing criterion is met, and send a trip signal if the second arcing criterion is met.

20. An electrically protected system, comprising:
an electrical load; and
an electrical fault interrupting apparatus coupled to the electrical load and having
an electrical circuit adapted to monitor a current waveform and high frequency noise, and
a microprocessor coupled to the electrical circuit, the microprocessor adapted to determine if first arcing criterion is met, determine if delay criterion is met in response to determining that the first arcing criterion is met, initiate a delay based upon whether the delay criterion is met, and after the delay, determine if second arcing criterion is met, and send a trip signal to interrupt current to the load if second arcing criterion is met.

* * * * *